United States Patent
August et al.

(10) Patent No.: US 7,567,780 B2
(45) Date of Patent: Jul. 28, 2009

(54) DATA EXCHANGE SYSTEMS AND METHODS EMPLOYING RF DATA TRANSMISSION

(75) Inventors: Clifford J. August, 20 West 18th Avenue, Vancouver, British Columbia (CA) V5Y 2A4; Henry Hon-Yiu Leung, Coquitlam (CA); Thomas Heinrich Sternberg, Delta (CA)

(73) Assignee: Clifford J. August, Vancouver, BC (CA)

( * ) Notice: Subject to any disclaimer, the term of this patent is extended or adjusted under 35 U.S.C. 154(b) by 0 days.

(21) Appl. No.: 11/732,938

(22) Filed: Apr. 4, 2007

(65) Prior Publication Data

US 2007/0293154 A1    Dec. 20, 2007

Related U.S. Application Data

(60) Provisional application No. 60/788,633, filed on Jun. 20, 2006, provisional application No. 60/788,870, filed on Jun. 20, 2006.

(51) Int. Cl.
*H04B 5/00* (2006.01)
(52) U.S. Cl. ............... 455/41.1; 455/41.2; 455/41.3
(58) Field of Classification Search ........... 455/41.1, 455/41.2, 41.3
See application file for complete search history.

(56) References Cited

U.S. PATENT DOCUMENTS

| | | | |
|---|---|---|---|
| 6,213,879 B1 | 4/2001 | Niizuma et al. | |
| 6,940,974 B2 | 9/2005 | August et al. | |
| 6,961,425 B2 | 11/2005 | August | |
| 6,978,118 B2* | 12/2005 | Vesikivi et al. | 455/41.1 |
| 6,983,124 B1* | 1/2006 | Bayley et al. | 455/41.2 |
| 7,274,909 B2* | 9/2007 | Perttila et al. | 455/41.2 |
| 2005/0054408 A1* | 3/2005 | Steil et al. | 463/11 |

* cited by examiner

*Primary Examiner*—Matthew D Anderson
*Assistant Examiner*—Wen W Huang
(74) *Attorney, Agent, or Firm*—Michael R. Schacht; Schacht Law Office, Inc.

(57) ABSTRACT

A data exchange system that exchanges data with a host device comprising controller and a host housing comprises at least one button assembly and a button reader system. The at least one button assembly comprises an encoder for storing data, a button coil, and a switch. Closing the switch forms an antenna circuit. The button reader system comprises a decoder and at least one reader coil defining at least one button position on the host housing. When the at least one button assembly is arranged at the at least one button position, the controller of the host device causes the decoder to obtain data from the encoder through the button coil and the reader coil when the switch is closed.

18 Claims, 5 Drawing Sheets

DATA EXCHANGE SYSTEMS AND METHODS EMPLOYING RF DATA TRANSMISSION

RELATED APPLICATIONS

This application claims priority of U.S. Provisional Patent Application Ser. Nos. 60/788,633 filed Jun. 20, 2006, and 60/788,870 filed Jun. 20, 2006. The contents of all related application listed above are incorporated herein by reference.

TECHNICAL FIELD

The present invention relates to radio frequency identification (RFID) systems and, in particular, to RFID systems that store data in a manner that allows the downloading of data to be controlled.

BACKGROUND OF THE INVENTION

RFID systems are becoming ubiquitous in everyday life. An RFID system contains two basic elements: a tag unit and an interrogator unit. The tag unit typically comprises an IC and an antenna. The IC comprises memory and processing circuitry. The interrogator unit contains an RF transceiver, processing circuitry, and an antenna. Power to the tag IC may be provided by the interrogator unit, so the tag unit need not contain a power storage system such as a battery. A tag unit that does not contain a power storage system is referred to as a passive tag unit. The interrogator portion may generate a signal that activates any tag unit within reach of the signal. When activated, any tag unit within signal reach transmits any data stored on the memory to the interrogator unit.

In many contexts, the data stored by a tag unit is not confidential. However, in other contexts, the stored data is confidential, and it is desirable to limit access to the data stored on a tag unit. The present invention relates to RFID systems and methods designed to limit access to data stored on a tag unit.

The present invention is of particular significance in the context of a button assembly that stores personal information such as telephone numbers, addresses, and the like. The present invention will thus be described herein in the context of RFID systems and methods that allow personal data to be transmitted from a button assembly to an electronic device such as a telephone or computer for storage and/or further processing. However, the principles of the present invention may have broader application, and the principles of the present invention should be determined by the claims appended hereto and not the following detailed description of the invention.

SUMMARY OF THE INVENTION

The present invention may be embodied as a data exchange system that exchanges data with a host device comprising controller and a host housing comprises at least one button assembly and a button reader system. The at least one button assembly comprises an encoder for storing data, a button coil, and a switch. Closing the switch forms an antenna circuit. The button reader system comprises a decoder and at least one reader coil defining at least one button position on the host housing. When the at least one button assembly is arranged at the at least one button position, the controller of the host device causes the decoder to obtain data from the encoder through the button coil and the reader coil when the switch is closed.

DETAILED DESCRIPTION OF THE INVENTION

The principles of the present invention may be embodied in many different forms, and two example data exchange systems using the principles of the present invention will be described below.

I. First Example Data Exchange System

Figure 1:
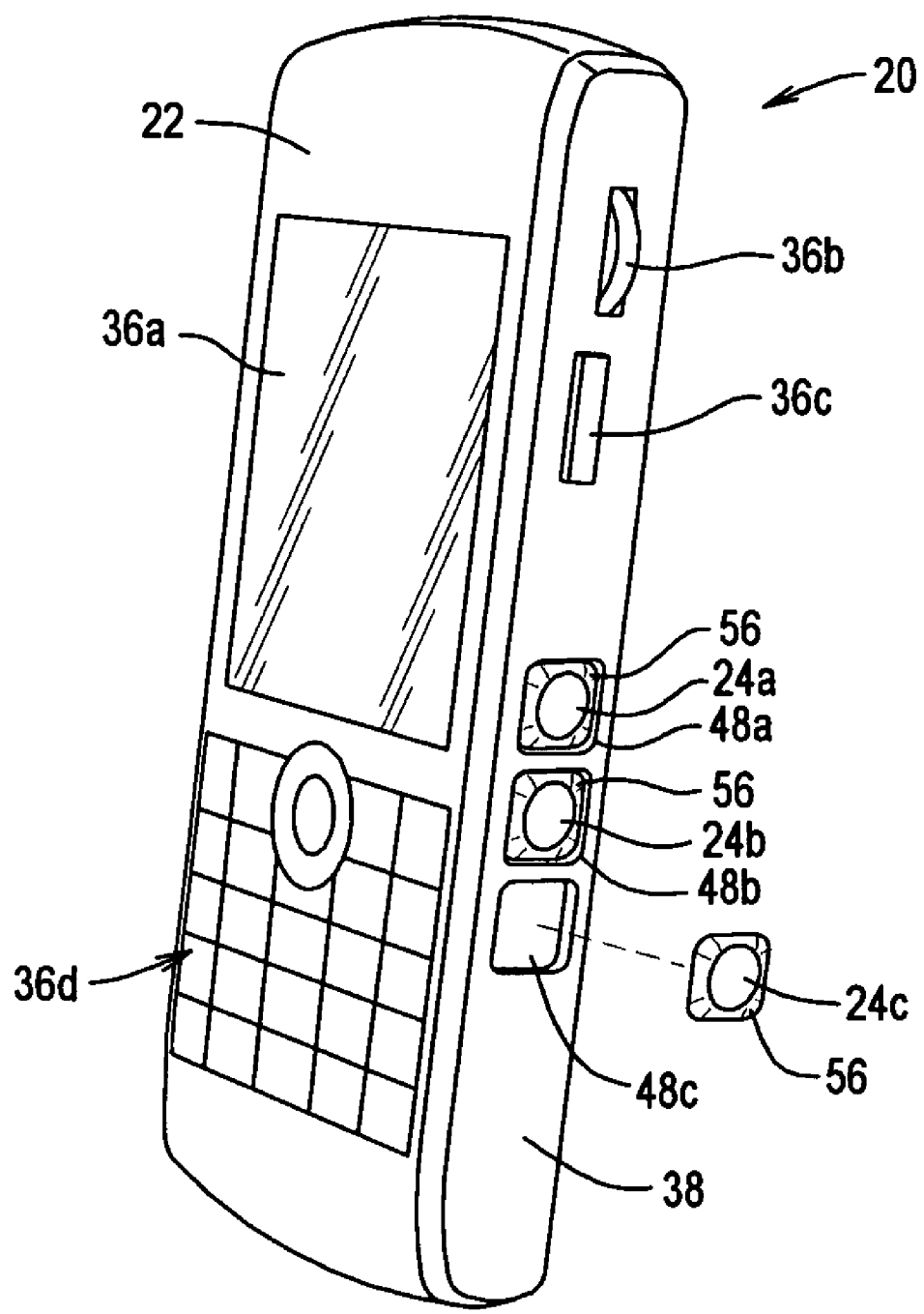
FIG. 1 is a perspective view of a cell phone configured to include an example data exchange system constructed in accordance with, and embodying the principles of the present invention.
Figure 2:
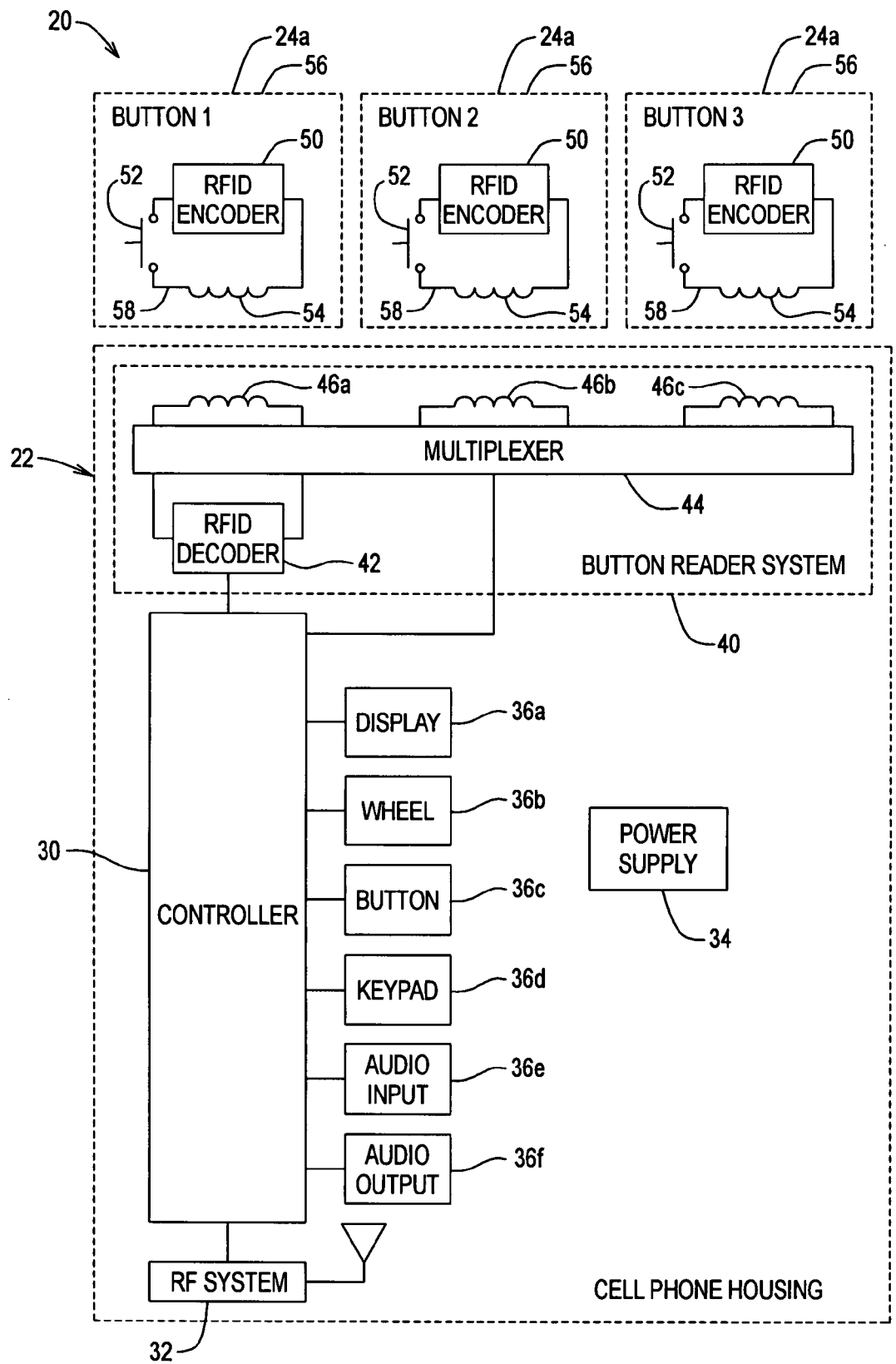
FIG. 2 is a block diagram of the cell phone and example data exchange system of FIG. 1.

Referring initially to FIG. 1 of the drawing, depicted at 20 therein is a first example data exchange system constructed in accordance with, and embodying, the principles of the present invention. The first example data exchange system 20 is used to transfer data between a cell phone device 22 and a plurality of button assemblies 24a, 24b, and 24c.

The example cell phone device 22 comprises a controller 30, an RF system 32, a power supply 34, and a plurality of peripherals connected to the controller 30. As is conventional, the cell phone system 22 may contain additional features such as GPS systems, camera subsystems, and the like.

The controller 30 comprises memory and software for implementing conventional phone digital processing and logic as will be described in further detail below. The RF system 32 converts a baseband signal into an RF signal for transmission in accordance with any one of a number of conventional cellular telephone standards. The power supply 34 is conventional in that it generates, based on battery and/or line power, power signals appropriate for the electronic components of the phone device 22. The controller 30, RF system 32, and power supply 34 are or may be conventional.

The example cell phone device 22 comprises peripherals in the form a display 36a, a roller 36b, a button 36c, a keypad 36d, audio input 36e, and audio output 36f. Again, the device 22 may contain additional peripheral systems including touch screen readers, stylus based pointing devices, trackballs, voice recognition systems, vibrator systems, and the like.

The peripherals 36a, 36b, 36c, 36d, 36e, and 36f also are or may be conventional. Software running on the controller 30 generates a user interface that is displayed on the display 36a. The roller 36b, button 36c, keypad 36d allow a user to navigate the user interface and input data into cell phone device 22. The audio input system 36e allows the user to enter voice signals into the device 22, while the audio output system 36f allows the device 22 to generate sounds such as voice signals and alarms.

The example cell phone device 22 further comprises a cell phone housing 38. The controller 30, RF system 32, and power supply 34 are supported within the cell phone housing 38. The example peripherals 36a, 36b, 36c, 36d, 36e, and 36f are all supported by the housing 38 such that the user of the cell phone device 22 may perceive or access these peripherals. Cell phone housings come in many different configurations, and the example cell phone housing 38 depicted in FIG. 1 is presented by way of illustration only.

The example cell phone device 22 further comprises a button reader system 40. The button reader system 40 comprises an RFID decoder 42, a multiplexer 44, and one or more reader coils 46a, 46b, and 46c. Each of the reader coils 46a, 46b, and 46c is associated with a button position 48a, 48b, and 48c on the cell phone housing 38 as shown in FIG. 1.

While the example cell phone device 22 comprises three reader coils and associated button positions, a cell phone device of the present invention can employ as few as one reader coil and associated button position or any number of coils and button positions as can be accommodated by the housing 38. If only one reader coil and associated button position is provided, the multiplexer 44 may not be required.

The example button assemblies 24 are the same, but the physical construction and electronic circuits of one or more these button assemblies 24 may be different from the others. Each of the example button assemblies 24 comprises an RFID encoder 50, a switch 52, and a button coil 54. The encoder 50, switch 52, and coil 54 are contained within a button housing 56.

Each button housing 56 is sized and dimensioned to be supported by the cell phone housing 38 at any one of the button positions 48a, 48b, and 48c. FIG. 1 identifies one button assembly 24a at the button position 48a, one button assembly 24b at the button position 48b, and one button assembly 24c at the button position 48c. The button housing 56 may form a friction fit with the cell phone housing 38 or may include a positive mechanical latch to support the button housing 56 at a desired one of the button positions 48.

When the switch 52 is in a closed state, an antenna circuit 58 is formed that includes the RFID encoder 50 and the button coil 54. When the switch 52 is closed, the antenna circuit 58 allows the RFID encoder 50 to be energized. When energized, the RFID encoder 50 generates an RF data signal that is transmitted from the button coil 54. The RF data signal contains data stored by the RFID encoder 50.

The controller 30 runs software configured to operate the multiplexer 44 to connect a selected one of the reader coils 46 to the RFID decoder 42. The controller 30 further operates the RFID decoder 42 to energize the selected reader coil 46. Typically, the controller 30 will operate the multiplexer 44 to cycle among the plurality of reader coils 46 if more than one reader coil 46 is used.

When the selected reader coil 46 is energized by the RFID decoder 42 as described above, the selected reader coil 46 transmits an RF power signal. If the button coil 54 of any one of the button assemblies 24 is within range of the RF power signal generated by the selected reader coil 46, any button coil 54 adjacent to the selected reader coil 46 converts the RF power signal into a current capable of energizing the RFID encoder 50 connected to the adjacent button coil 54.

If the switch 52 connected to the button coil 54 that receives the RF power signal is open, the antenna circuit 58 is not formed, and the RFID encoder 50 is not energized. If, however, the switch 52 connected to the button coil 54 that receives the RF power signal is closed, the antenna circuit 58 is formed, and the adjacent button coil 54 generates a current that energizes the RFID encoder 50. As described above, the RFID encoder 50 generates the RF data signal when energized. The adjacent button coil 54 thus transmits the RF data signal to the selected reader coil 46 adjacent thereto.

The selected reader coil 46 receives the RF data signal and converts the RF data signal into a current that is received by the RFID decoder 42 through the multiplexer 44. The RFID decoder 42 extracts from the RF data signal the data stored by the RFID encoder 50 connected to the adjacent button coil 54.

The RFID encoder 50 then passes the extracted data to the controller 30. In the example data exchange system 20, the extracted data corresponds to a telephone number or a portion of a telephone number. The controller 30 generates DTMF signals corresponding to the telephone number or portion of a telephone number. The controller 30 may generate appropriate dialing signals using existing dialing capabilities of the cell phone device 22.

The RFID decoder 42 and RFID encoder 50 are or may be conventional. The RFID system formed by the decoder 42 and encoder 50 can be used both to transmit data from the button assemblies 24 to the button reader system 40 and, under appropriate conditions, form a conventional RFID programming system to allow programming of the RFID encoder 50 of the button assemblies 24. Alternatively, data may be stored directly onto the RFID encoder 50 using electrical contacts (not shown).

The power to the button assemblies 24 is provided by the power supply 34 through the RFID decoder 42. Typically, the power supply 34 will comprise a power management system to minimize power consumption when the cell phone device 22 is operating under battery power. As part of this power management system, the controller 30 may be programmed to controller the RFID decoder 42 and multiplexer 44 to minimize power consumption by the button reader system 40.

II. Second Example Data Exchange System

Figure 3:
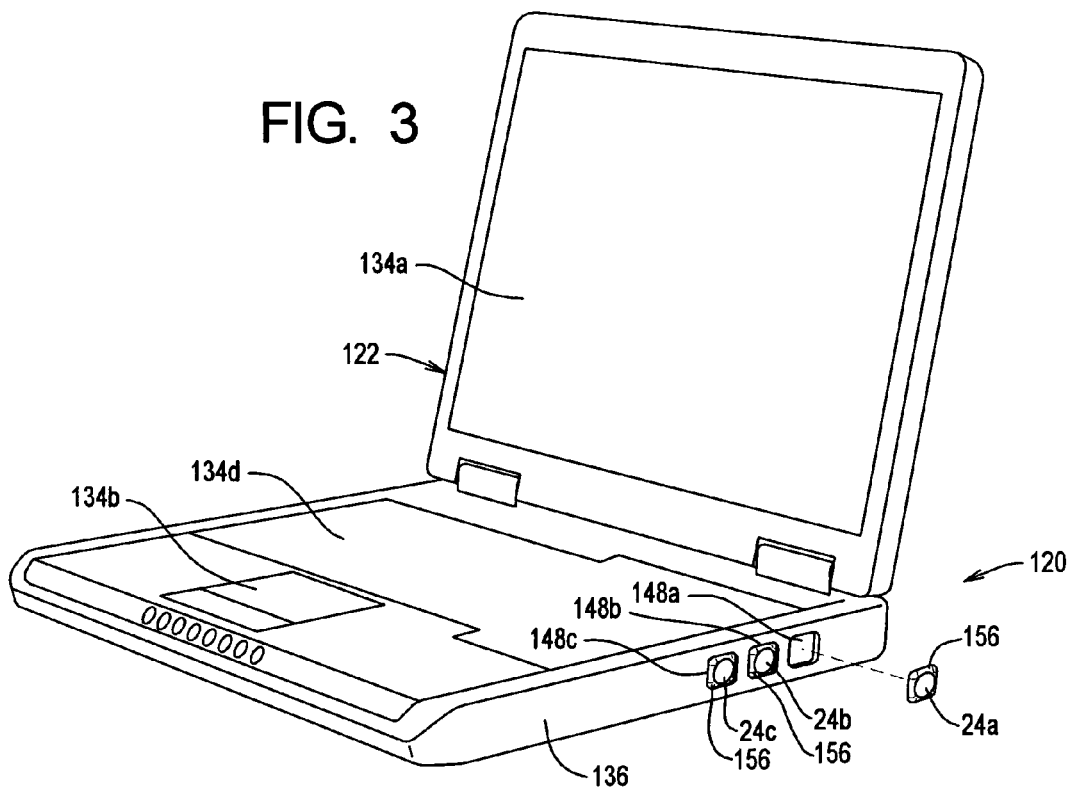
FIG. 3 is a perspective view of a computing device adapted to include a data exchange system similar to that employed by the cell phone of FIG. 1.

Referring now to FIG. 3 of the drawing, depicted at 120 therein is a second example data exchange system constructed in accordance with, and embodying, the principles of the present invention. The first example data exchange system 120 is used to transfer data between a computing device 122 and a plurality of button assemblies 24.

The example computing device 122 is a conventional portable or laptop computer comprising a controller 130 and a power supply 132. As is conventional, the controller 130 runs an operating system. Typically, the operating system defines a user interface and/or hosts application programs that define a user interface. The power supply 132 provides power to the controller 130 and any peripheral devices forming part of the computing device 122. The example controller 130 and power supply 132 are or may be conventional and will not be described herein beyond the extent necessary for a complete understanding of the present invention.

The example computing device 122 comprises peripherals in the form a display 134a, a touch pad 134b, dedicated function buttons 134c, a keypad 134d. The peripherals 134a, 134b, 134c, and 134d are connected to the controller 130 in a conventional manner. Again, the device 122 may contain additional peripheral systems including stylus based pointing devices, audio input and output systems, trackballs, voice recognition systems, network connection systems, and the like.

The peripherals 134a, 134b, 134c, and 134d also are or may be conventional. Software running on the controller 130 generates a user interface that is displayed on the display 134a. The touch pad 134b, dedicated function buttons 134c, and keypad 134d allow a user to navigate the user interface and input data into computing device 122.

The example computing device 122 further comprises a housing 136. The example peripherals 134a, 134b, 134c, and 134d are all supported by the housing 136 such that the user of the computing device 122 may perceive or access these peripherals. Housings for computing devices come in many different configurations, and the example housing 136 depicted in FIG. 1 is presented by way of illustration only.

Figure 4:
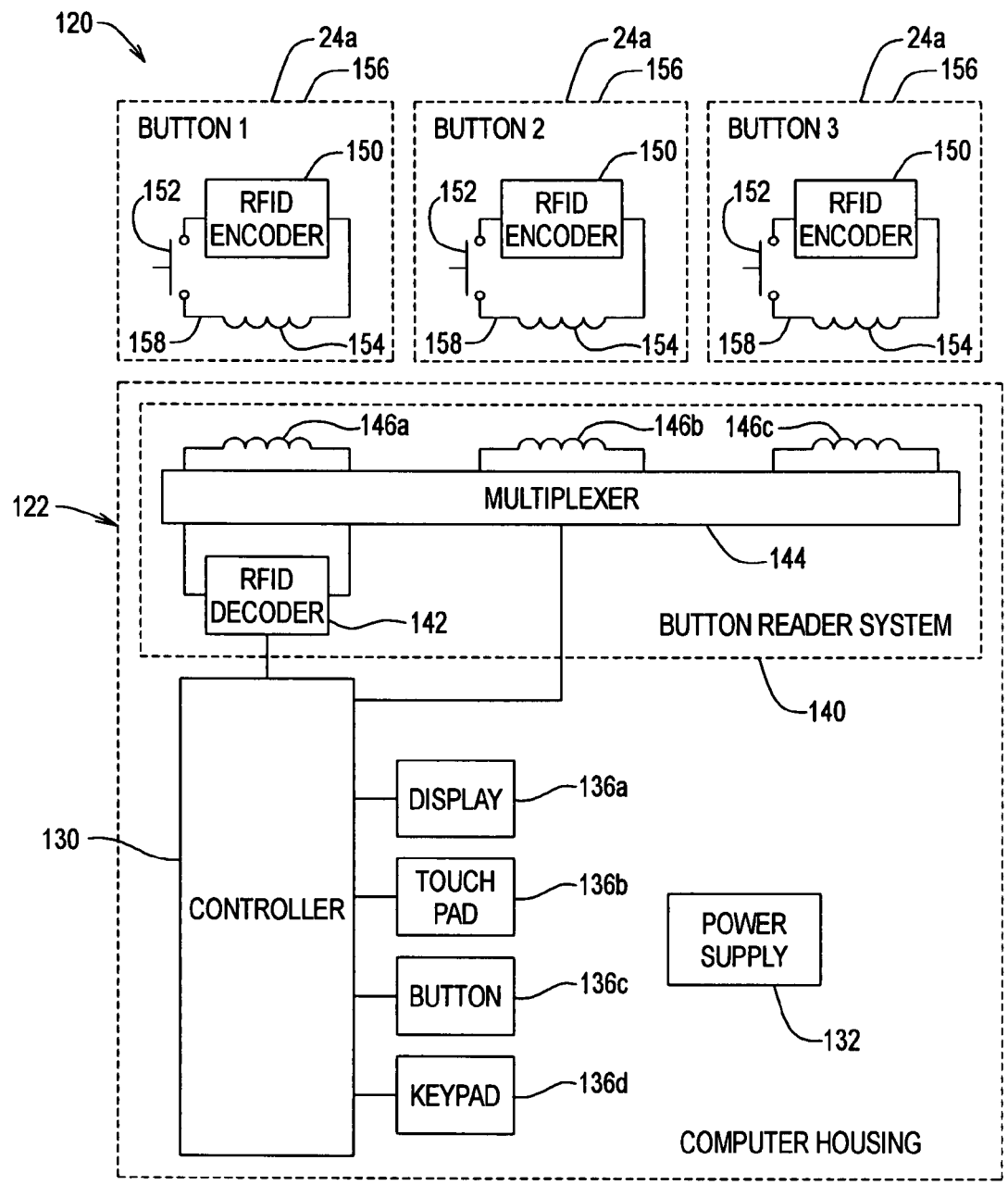
FIG. 4 is a block diagram of the computing device and example data exchange system of FIG. 3.

The example computing device 122 further comprises a button reader system 140. The button reader system 140 comprises an RFID decoder 142, a multiplexer 144, and one or more reader coils 146a, 146b, and 146c. Each of the reader coils 146a, 146b, and 146c is associated with a button position 148a, 148b, and 148c on the housing 136 as shown in FIG. 3. FIG. 4 illustrates that the button assembly 24a is associated with the button position 148a, the button assembly 24b is associated with the button position 148b, and the button assembly 24c is associated with the button position 148c.

While the example computing device 122 comprises three reader coils and associated button positions, a computing device of the present invention can employ as few as one reader coil and associated button position or any number of coils and button positions as can be accommodated by the housing 136. Again, if only one reader coil and associated button position are provided, the multiplexer 144 may be omitted.

The example button assemblies 24 are the same, but the physical construction and electronic circuits of one or more these button assemblies 24 may be different from the others.

Each of the example button assemblies 24 comprises an RFID encoder 150, a switch 152, and a button coil 154. The encoder 150, switch 152, and coil 154 are contained within a button housing 156.

The button housing 156 is sized and dimensioned to be supported by the housing 136 at any one of the button positions 148a, 148b, and 148c. The button housing 156 may form a friction fit with the housing 136 or may include a positive mechanical latch to support the button housing 156 at a desired one of the button positions 148.

When the switch 152 is in a closed state, an antenna circuit 158 is formed that includes the RFID encoder 150 and the button coil 154. When the switch 152 is closed, the antenna circuit 158 allows the RFID encoder 150 to be energized. When energized, the RFID encoder 150 generates an RF data signal that is transmitted from the button coil 154. The RF data signal contains data stored by the RFID encoder 150.

The controller 130 runs software configured to operate the multiplexer 144 to connect a selected one of the reader coils 146 to the RFID decoder 142. The computing device 122 further operates the RFID decoder 142 to energize the selected reader coil 146. Typically, the computing device 122 will operate the multiplexer 144 to cycle among the plurality of reader coils 146 if more than one reader coil 146 is used.

When the selected reader coil 146 is energized by the RFID decoder 142 as described above, the selected reader coil 146 transmits an RF power signal. If the button coil 154 of any one of the button assemblies 24 is within range of the RF power signal generated by the selected reader coil 146, any button coil 154 adjacent to the selected reader coil 146 converts the RF power signal into a current capable of energizing the RFID encoder 150 connected to the adjacent button coil 154.

If the switch 152 connected to the button coil 154 that receives the RF power signal is open, the antenna circuit 158 is not formed, and the RFID encoder 150 is not energized. If, however, the switch 152 connected to the button coil 154 that receives the RF power signal is closed, the antenna circuit 158 is formed, and the adjacent button coil 154 generates a current that energizes the RFID encoder 150. As described above, the RFID encoder 150 generates the RF data signal when energized. The adjacent button coil 154 thus transmits the RF data signal to the selected reader coil 146 adjacent thereto.

The selected reader coil 146 receives the RF data signal and converts the RF data signal into a current that is received by the RFID decoder 142 through the multiplexer 144. The RFID decoder 142 extracts from the RF data signal the data stored by the RFID encoder 150 connected to the adjacent button coil 154.

The RFID encoder 150 then passes the extracted data to the computing device 122. In the example data exchange system 120, the extracted data may be any data capable of storage in digital form. One example of data that may be stored by the encoder 150 will be described in further detail below.

The RFID decoder 142 and RFID encoder 150 are or may be conventional. The RFID system formed by the decoder 142 and encoder 150 can be used both to transmit data from the button assemblies 24 to the button reader system 140 and, under appropriate conditions, form a conventional RFID programming system to allow programming of the RFID encoder 150 of the button assemblies 24. Alternatively, data may be stored directly onto the RFID encoder 150 using electrical contacts (not shown).

The power to the button assemblies 24 is provided by the power supply 132 through the RFID decoder 142. Typically, the power supply 132 will comprise a power management system to minimize power consumption when the computing device 122 is operating under battery power. As part of this power management system, the computing device 122 may be programmed to controller the RFID decoder 142 and multiplexer 144 to minimize power consumption by the button reader system 140.

III. Tracking Systems

Figure 5:
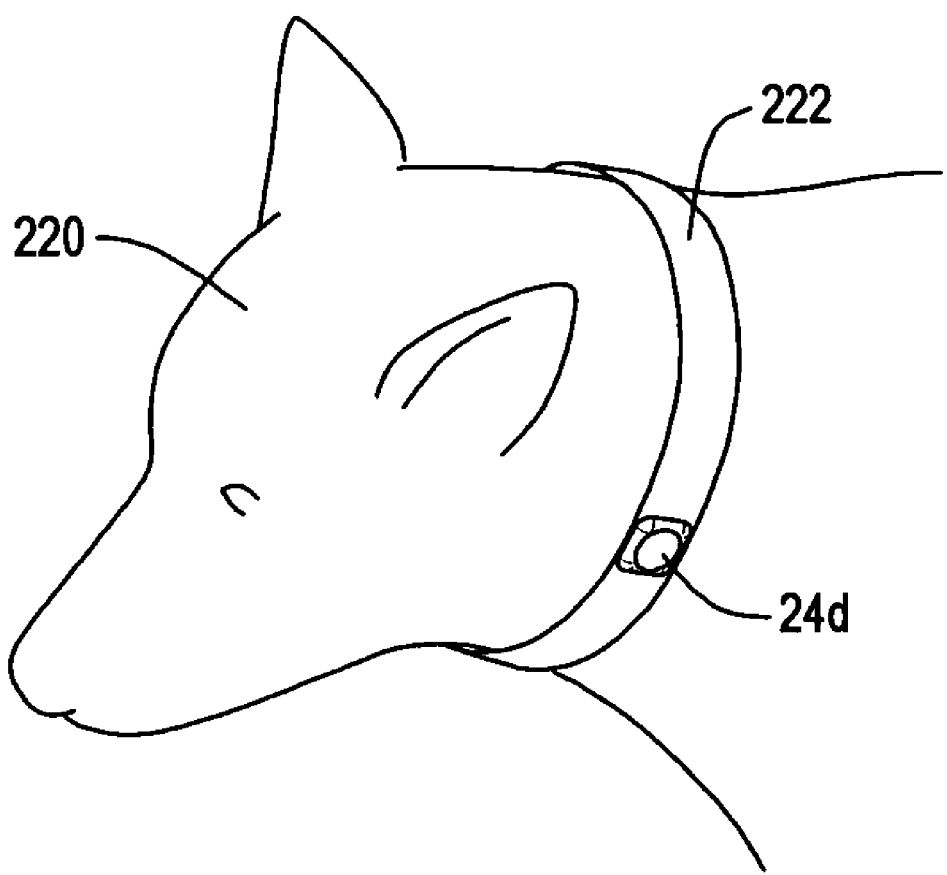
FIG. 5 is a perspective view of a pet wearing a collar to which is attached a button assembly for use by a data exchange system such as those described with respect to FIGS. 1-3.

As described above, the buttons 24 may store any type of data capable of being stored electronically. One example of a use of such buttons is depicted in FIG. 5. FIG. 5 depicts a dog 220 wearing a collar 222. Attached to the collar is a button 24d containing data associated with the dog 220, such as the dog's name and contact information for the dog's owner. Someone finding the button 24d associated with the dog 220 could thus place the button in a button position 48 such as those associated with the cell phone device 22 to call the dog's owner and/or in a button position 148 such as those associated with the computing device 22 to extract data from the button 24d.

This same principle may be applied to objects other than pets, such as electronic equipment and the like. Buttons like the button 24d may thus be used as part of a larger tracking system to notify finders of objects of how to return the found object.

IV. Summary

In general, the present invention allows the user of the button assemblies 24 to control when the data stored thereon is downloaded by requiring that the switch 52 be closed to allow the antenna circuit 58 to be formed. The button assemblies may be discrete or may be incorporated as part of another structure such as a business card, credit card, identification card, or the like. To this end, security can also be enhanced by designing the antenna circuit such that the button assembly must be within a first range of less than approximately three inches, within a second range of less than approximately one inch, and in the preferred embodiments approximately one-half inch.

In addition, the button assemblies 24 may be constructed to operate as part of a larger system such as those described in the Applicant's issued U.S. Pat. Nos. 6,940,974 and 6,961,425 and copending patent application Ser. Nos. 11/253,108, 11/583,461, and 11/583,523. The disclosures of those patents and patent applications are hereby incorporated herein by reference.

The present invention may thus be embodied in many forms other than those depicted and described herein. The scope of the present invention should be determined based on the claims appended hereto and not the foregoing detailed description.

We claim:

1. A data exchange system for exchanging data with a host device comprising controller and a host housing, comprising:
   at least one button assembly comprising an encoder for storing data, a button coil, and a switch, where closing the switch forms an antenna circuit; and
   a button reader system comprising at least one reader coil defining at least one button position on the host housing and a decoder; whereby
   when the at least one button assembly is arranged at the at least one button position, the host housing engages the at least one button assembly to detachably attach the at least button assembly to the host housing such that the button coil of each button assembly detachably attached to the host housing is adjacent to one reader coil;
   when the at least one button assembly is attached to the host housing, closing the switch of the at least one button assembly
     forms an antenna circuit that allows the controller of the host device to cause the decoder to obtain data from the encoder through the button coil and the reader coil; and
     causes the controller of the host device to operate the host device based on the data associated with the encoder.

2. A data exchange system as recited in claim 1, further comprising a plurality of button assemblies, wherein:
   the button reader system further comprises a multiplexer and a plurality of reader coils, where each reader coil defines one button position on the host housing;
   when a plurality of button assemblies are attached to the host housing, each button assembly is arranged adjacent to one of the button positions; and
   the controller operates the multiplexer to connect the decoder to a selected one of the reader coils.

3. A data exchange system as recited in claim 1, in which the host device is a cell phone device.

4. A data exchange system as recited in claim 1, in which the host device is a computing device.

5. A data exchange system as recited in claim 1, in which the encoder obtains power from the button reader system.

6. A data exchange system as recited in claim 5, in which the button reader system obtains power from the host device.

7. A data exchange system as recited in claim 1, in which the encoder obtains power from the host device.

8. A method of exchanging data with a host device comprising controller and a host housing, comprising the steps of:
   providing at least one button assembly comprising an encoder for storing data, a button coil, and a switch;
   arranging at least one reader coil on the host housing to define at least one button position;
   operatively connecting a decoder to the at least one reader coil;
   detachably attaching the at least one button assembly to the host housing such that the at least one button assembly is engaged to the host housing at the at least one button position such that the button coil of each button assembly detachably attached to the host housing is adjacent to one reader coil;
   closing the switch to form an antenna circuit;
   operating the decoder to obtain data from the encoder through the button coil and the reader coil through the antenna circuit, where the decoder obtains data from the encoder only when the switch is closed to form the antenna circuit; and
   when the switch is closed, operating the host device based on data associated with the encoder.

9. A method as recited in claim 8, further comprising the steps of:
   providing a plurality of button assemblies;
   providing a plurality of reader coils, where each reader coil defines one button position;
   arranging a multiplexer between the decoder and the plurality of reader coils;
   attaching a plurality of the button assemblies to the host housing such that each button assembly is arranged adjacent to one of the button positions; and
   operating the multiplexer to connect the decoder to a selected one of the reader coils.

10. A method as recited in claim 8, in which the host device is a cell phone device.

11. A method as recited in claim 8, in which the host device is a computing device.

12. A method as recited in claim 8, further comprising the step of providing power to the encoder from the button reader system.

13. A method as recited in claim 12, further comprising the step of providing power to the button reader system from the host device.

14. A method as recited in claim 8, further comprising the step of providing power to the encoder from the host device.

15. A data exchange system for exchanging data with a host device comprising a controller and a housing, comprising:
   a button reader system comprising a plurality of reader coils, a decoder, and a multiplexer where the button reader system obtains power from the host device;
   a plurality of button assemblies each comprising an encoder, a button coil, and a switch, where
     closing the switch forms an antenna circuit, and
     the encoders obtain power from the button reader system; whereby
   the host housing engages at least one button assembly to detachably attach at least button assembly to the housing of the host device such that the button coil of each button assembly detachably attached to the housing of the host is adjacent to one reader coil;
   when the switch is closed, the controller
     causes the multiplexer to connect the decoder to a selected one of the reader coils, causes the decoder to obtain data from the encoder through the button coil and the selected reader coil when the switch is closed, causes the decoder to transfer data to the controller, and causes the controller of the host device to operate the host device based on the data associated with the encoder; and when the switch is open, the decoder is unable to obtain data from the encoder.

16. A data exchange system as recited in claim 15, in which the host device is a cell phone device.

17. A data exchange system as recited in claim 15, in which the host device is a computing device.

18. A data exchange system as recited in claim 15, in which the button reader system obtains power from the host device.

* * * * *